US012773802B2

(12) United States Patent
Eom et al.

(10) Patent No.: US 12,773,802 B2
(45) Date of Patent: Oct. 27, 2026

(54) CUTTER APPARATUS FOR DOUBLE PIPE

(71) Applicant: SEMES CO., LTD., Cheonan-si (KR)

(72) Inventors: Sung Hun Eom, Hwaseong-si (KR); Tae Won Yun, Namwon-si (KR)

(73) Assignee: Semes Co., Ltd., Cheonan-si (KR)

( * ) Notice: Subject to any disclaimer, the term of this patent is extended or adjusted under 35 U.S.C. 154(b) by 824 days.

(21) Appl. No.: 18/056,059

(22) Filed: Nov. 16, 2022

(65) Prior Publication Data

US 2023/0158696 A1 May 25, 2023

(30) Foreign Application Priority Data

Nov. 24, 2021 (KR) ........................ 10-2021-0163420

(51) Int. Cl.
*B26D 3/16* (2006.01)

(52) U.S. Cl.
CPC ............. *B26D 3/163* (2013.01); *B26D 3/169* (2013.01)

(58) Field of Classification Search
CPC .......... B26D 3/16; B26D 3/169; B26D 3/163; B23D 21/06; B23D 21/14; B23D 21/145; B23D 21/10
See application file for complete search history.

(56) References Cited

U.S. PATENT DOCUMENTS 828,120 A * 8/1906 Jones ..................... B23D 21/14 30/103
2,728,137 A * 12/1955 Elliott .................. B23D 21/145 30/107
3,911,574 A * 10/1975 Jones ..................... B23D 21/14 30/103
4,146,959 A * 4/1979 Hopper .................. B26D 3/169 30/95
4,954,023 A 9/1990 Bromley
5,499,453 A * 3/1996 Brauchitsch ............ E03D 11/17 30/103
5,956,853 A * 9/1999 Watamura ............. B26D 3/169 30/95
6,671,962 B2 * 1/2004 Watamura ............. B26D 3/169 30/95
7,316,069 B2 1/2008 Graybeal
(Continued)

FOREIGN PATENT DOCUMENTS

DE 102018114106 B3 * 11/2019 ............ B26D 3/163
JP 3039458 U 7/1997
(Continued)

OTHER PUBLICATIONS

Office Action for Korean Application No. 10-2021-0163420 dated Jan. 9, 2026.

(Continued)

*Primary Examiner* — Jennifer S Matthews
(74) *Attorney, Agent, or Firm* — Harness, Dickey & Pierce, P.L.C.

(57) ABSTRACT

Disclosed is a cutter apparatus for a double tube for cutting an outer tube in a double pipe including an inner tube and the outer tube, the cutter apparatus for the double tube including: a main body which is grippable by a hand of an operator; a cylindrical protection member which is connected to the main body and into which the inner tube is inserted; and a cutter member including a blade for cutting the outer tube.

18 Claims, 16 Drawing Sheets

(56) References Cited

U.S. PATENT DOCUMENTS

| | | | | |
|---|---|---|---|---|
| 7,836,808 | B2 * | 11/2010 | Szymanski | B27B 33/144 83/831 |
| 7,913,395 | B1 * | 3/2011 | Nigh | B23D 21/08 83/745 |
| 2001/0050481 | A1 | 12/2001 | Takasaki et al. | |
| 2003/0221527 | A1 * | 12/2003 | Lee | B23D 21/14 83/187 |

FOREIGN PATENT DOCUMENTS

| | | | |
|---|---|---|---|
| KR | 101769825 | B1 | 9/2017 |
| KR | 101938152 | B1 | 1/2019 |

OTHER PUBLICATIONS

Office Action for Chinese Application No. 202211429591.5 dated Mar. 2, 2026.

* cited by examiner

CUTTER APPARATUS FOR DOUBLE PIPE

CROSS-REFERENCE TO RELATED APPLICATIONS

This application claims priority to and the benefit of Korean Patent Application No. 10-2021-0163420 filed in the Korean Intellectual Property Office on Nov. 24, 2021, the entire contents of which are incorporated herein by reference.

TECHNICAL FIELD

The present invention relates to a cutter apparatus for a double pipe.

BACKGROUND ART

In general, pipes are installed in a semiconductor line to supply each of various treating fluids used in the manufacturing of semiconductors, and among the pipes installed in the semiconductor line, pipes having a double structure are also used. Since the double pipe must be installed by cutting the outer pipe to be shorter than the inner pipe, it is not easy to safely cut only the outer pipe with the existing pipe cutter.

SUMMARY OF THE INVENTION

The present invention has been made in an effort to provide a double pipe cutter capable of safety cutting an outer pipe.

The object of the present invention is not limited thereto, and other objects not mentioned will be clearly understood by those of ordinary skill in the art from the following description.

An exemplary embodiment of the present invention provides a cutter apparatus for a double tube for cutting an outer tube in a double pipe including an inner tube and the outer tube, the cutter apparatus for the double tube including: a main body which is grippable by a hand of an operator; a cylindrical protection member which is connected to the main body and into which the inner tube is inserted; and a cutter member including a blade for cutting the outer tube.

Further, the cutter member may be provided to the protection member.

Further, the blade may be folded on the protection member, and protrude from the protection member when the outer tube is cut.

Further, the protection member may be provided rotatably on the main body, and the main body may be provided with a driving unit for rotating the protection member.

Further, the cutter apparatus for the double tube may further include a cylindrical outer cover provided to the main body and formed to surround the protection cover.

Further, the outer cover may be made of a transparent material, and have a scale to check a length of the outer tube to be cut.

Further, the cutter apparatus for the double tube may further include a tube fixing member for fixing the double tube before cutting the outer tube.

Further, the tube fixing member may include pressing pins installed on the outer cover to pressurize the outer tube.

Further, the tube fixing member may include an expandable member which is installed inside the inner cover and is inserted into the inner tube to fix the inner tube by an expansion operation Further, the cutter member may include: a support provided to the main body and adjustable in length; and a support ring installed at a distal end of the support and supporting the blade.

Another exemplary embodiment of the present invention provides a cutter apparatus for a double tube for cutting an outer tube in a double pipe including an inner tube and the outer tube, the cutter apparatus for the double tube including: a main body which is grippable by a hand of an operator; a cylindrical protection member which is rotatably connected to the main body and into which the inner tube is inserted; a cutter member provided to the protection member and including a blade for cutting the outer tube; and a driving unit for rotating the protection member.

Further, the blade may be folded on the protection member, and protrudes when the outer tube is cut.

Further, the cutter apparatus for the double tube may further include a cylindrical outer cover provided to the main body and formed to surround the protection cover.

Further, the outer cover may be made of a transparent material, and have a scale to check a length of the outer tube to be cut.

Further, the cutter apparatus for the double tube may further include a tube fixing member for fixing the double tube before cutting the outer tube.

Further, the tube fixing member may include pressing pins installed on the outer cover to pressurize the outer tube.

Further, the tube fixing member may include an expandable member which is installed inside the inner cover and may be inserted into the inner tube to fix the inner tube by an expansion operation Still another exemplary embodiment of the present invention provides a cutter apparatus for a double tube for cutting an outer tube in a double pipe including an inner tube and the outer tube, the cutter apparatus for the double tube including: a main body which is grippable by a hand of an operator; a cylindrical protective member which is connected to the main body and into which the inner tube is inserted; a cutter member provided to the protection member and including a blade for cutting the outer tube; and a cylindrical outer cover provided to the main body and formed to surround the outer tube located outside the protection cover.

Further, the outer cover may be made of a transparent material, and include a scale for checking a cut length of the outer tube.

Further, the cutter apparatus for the double tube may further include a tube fixing member for fixing the double tube before cutting the outer tube.

According to the exemplary embodiments of the present invention, it is possible to safely cut the outer tube in the double tube.

The effect of the present invention is not limited to the foregoing effects, and those skilled in the art may clearly understand non-mentioned effects from the present specification and the accompanying drawings.

DETAILED DESCRIPTION

Figure 1:
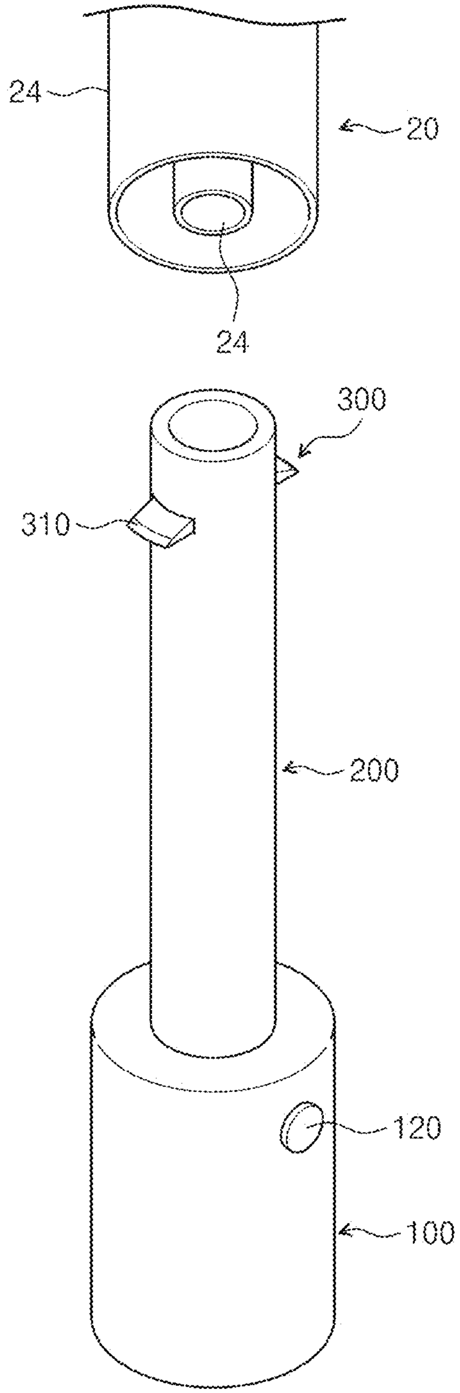
FIGS. 1 and 2 are a perspective view and a front view illustrating a cutter apparatus for a double tube according to a first exemplary embodiment of the present invention.

Hereinafter, an exemplary embodiment of the present invention will be described more fully hereinafter with reference to the accompanying drawings, in which exemplary embodiments of the invention are illustrated. However, the present invention can be variously implemented and is not limited to the following exemplary embodiments. In the following description of the present invention, a detailed description of known functions and configurations incorporated herein is omitted to avoid making the subject matter of the present invention unclear. In addition, the same reference numerals are used throughout the drawings for parts having similar functions and actions.

Unless explicitly described to the contrary, the word "comprise" and variations such as "comprises" or "comprising" will be understood to imply the inclusion of stated elements but not the exclusion of any other elements. It will be appreciated that terms "including" and "having" are intended to designate the existence of characteristics, numbers, operations, operations, constituent elements, and components described in the specification or a combination thereof, and do not exclude a possibility of the existence or addition of one or more other characteristics, numbers, operations, operations, constituent elements, and components, or a combination thereof in advance.

Singular expressions used herein include plurals expressions unless they have definitely opposite meanings in the context. Accordingly, shapes, sizes, and the like of the elements in the drawing may be exaggerated for clearer description.

Terms, such as first and second, are used for describing various constituent elements, but the constituent elements are not limited by the terms. The terms are used only to discriminate one constituent element from another constituent element. For example, without departing from the scope of the invention, a first constituent element may be named as a second constituent element, and similarly a second constituent element may be named as a first constituent element.

It should be understood that when one constituent element referred to as being "coupled to" or "connected to" another constituent element, one constituent element can be directly coupled to or connected to the other constituent element, but intervening elements may also be present. In contrast, when one constituent element is "directly coupled to" or "directly connected to" another constituent element, it should be understood that there are no intervening element present. Other expressions describing the relationship between the constituent elements, such as "between ~", and "just between ~" or "adjacent to ~" and "directly adjacent to ~" should be interpreted similarly.

All terms used herein including technical or scientific terms have the same meanings as meanings which are generally understood by those skilled in the art unless they are differently defined. Terms defined in generally used dictionary shall be construed that they have meanings matching those in the context of a related art, and shall not be construed in ideal or excessively formal meanings unless they are clearly defined in the present application.

The foregoing detailed description illustrates the present invention. Further, the above content illustrates and describes the exemplary embodiment of the present invention, and the present invention can be used in various other combinations, modifications, and environments. That is, the foregoing content may be modified or corrected within the scope of the concept of the invention disclosed in the present specification, the scope equivalent to that of the disclosure, and/or the scope of the skill or knowledge in the art. The foregoing exemplary embodiment describes the best state for implementing the technical spirit of the present invention, and various changes required in specific application fields and uses of the present invention are possible. Accordingly, the detailed description of the invention above is not intended to limit the invention to the disclosed exemplary embodiment. Further, the accompanying claims should be construed to include other exemplary embodiments as well.

Figure 2:
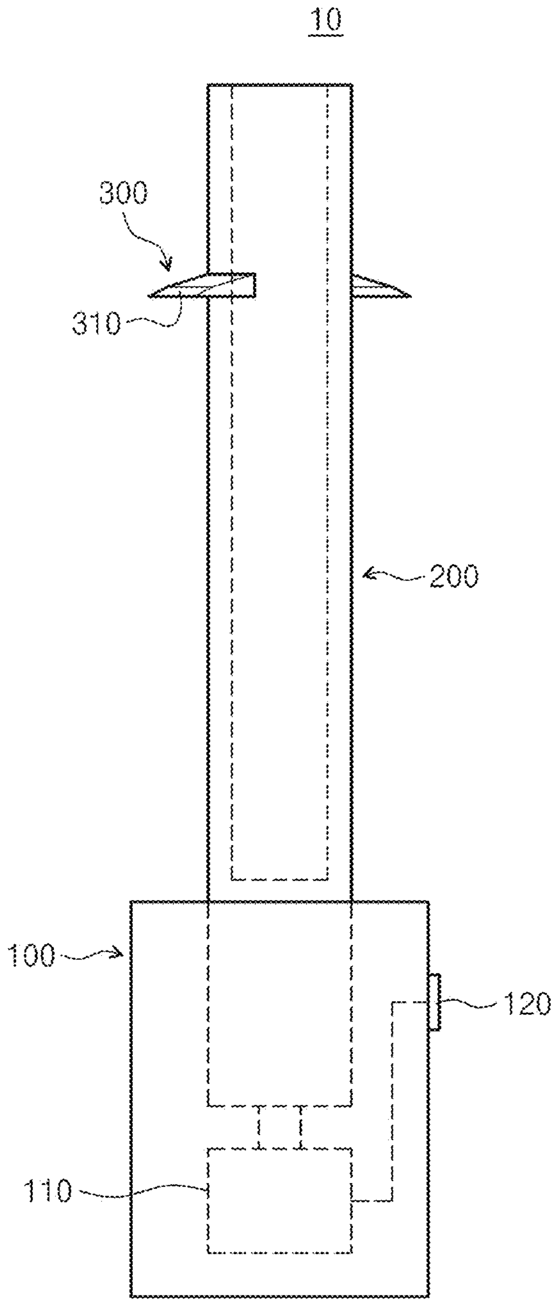

FIGS. 1 and 2 are a perspective view and a front view illustrating a cutter apparatus for a double tube according to a first exemplary embodiment of the present invention.

Referring to FIGS. 1 and 2, the cutter apparatus 10 for the double tube may include a main body 100 that an operator can grip by hand, a protection member 200 connected to the main body 100, and a cutter member 300.

The protection member 200 is provided in a cylindrical shape. One end of the protection member 200 may be rotatably connected to the main body 100. The other end of the protection member 200 is open, and provides a space into which an inner tube 22 of a double tube 20 is inserted. The protection member 200 may be rotated by a driving unit 110 installed on the main body 100. The main body 100 may be provided with an operation button 120 for operating the driving unit 110.

The cutter member 300 may include a blade 310 for cutting an outer tube 24. The blade 310 may be installed on the protection member 200 so as to spread when the outer tube 24 is cut.

Figure 3A:
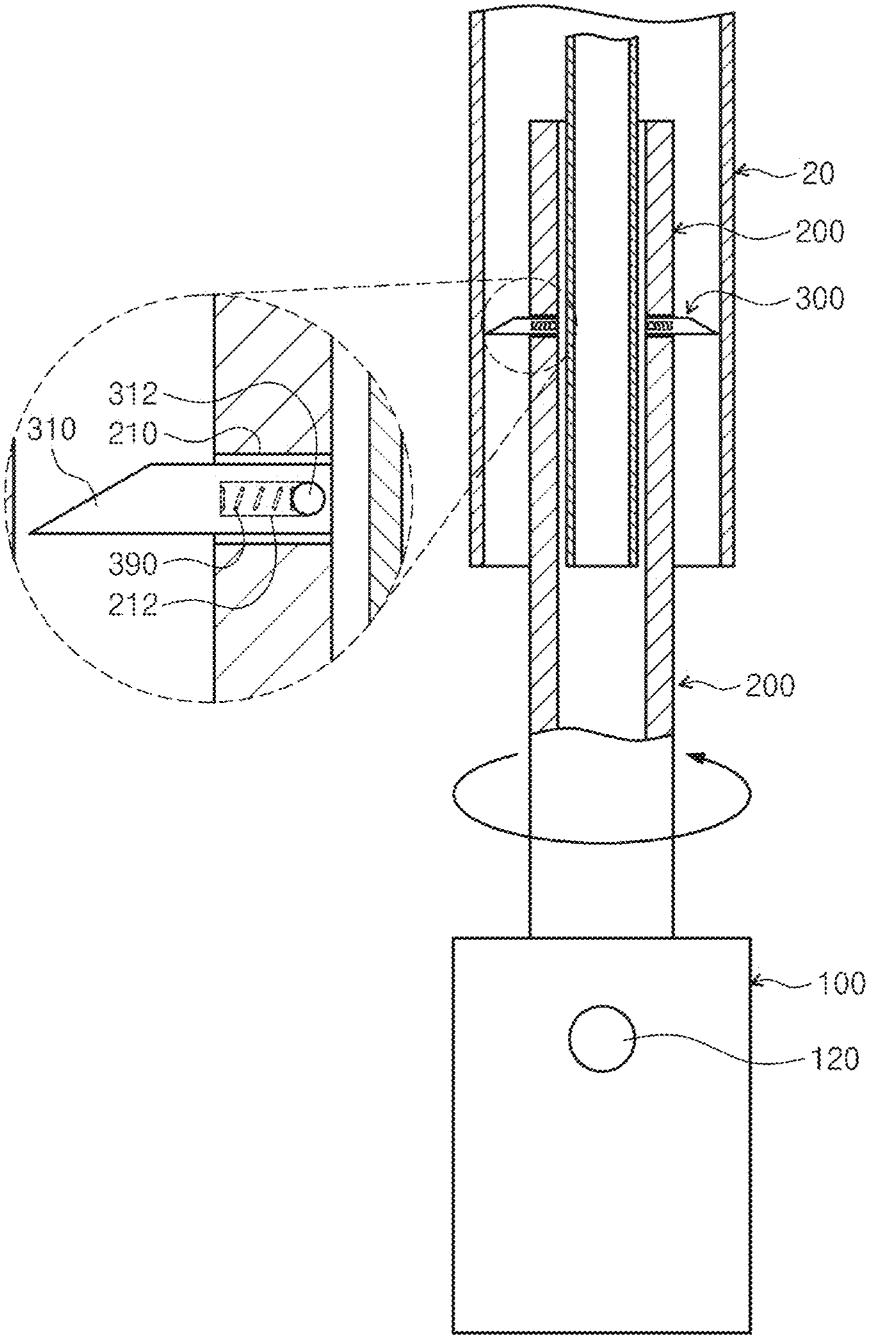
FIGS. 3A and 3B are diagrams illustrating a process of cutting an outer cover by the cutter apparatus for the double tube according to the first exemplary embodiment.
Figure 3B:
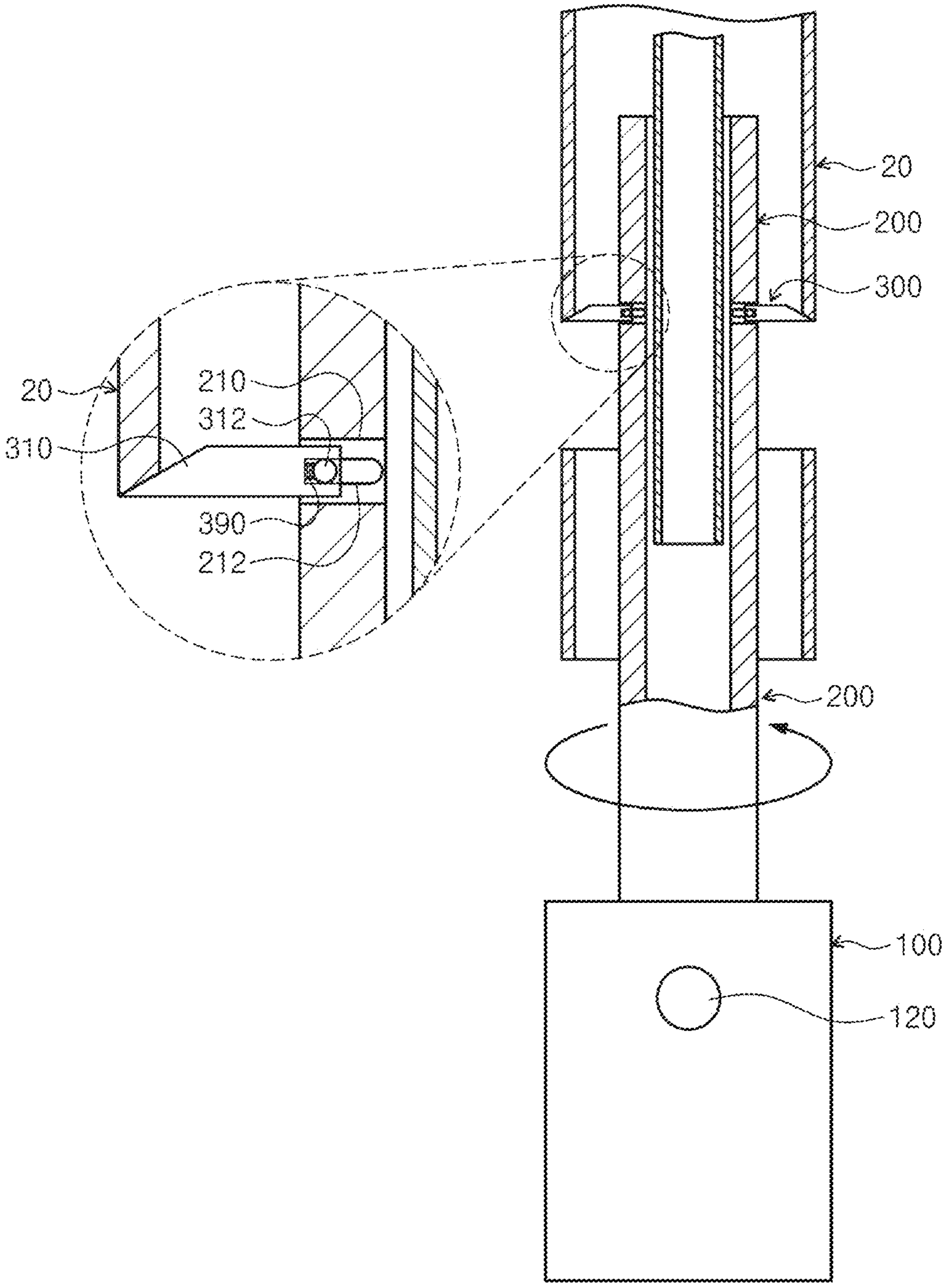

FIGS. 3A and 3B are diagrams illustrating a process of cutting an outer cover by the cutter apparatus for the double tube according to the first exemplary embodiment.

As illustrated in FIGS. 3A and 3B, when the operation button 120 is pressed while the double tube 20 is positioned so that the inner tube 22 is inserted into the protection member 200, the protection member 200 is rotated. By the rotation of the protection member 200, the blade 310 cuts the outer tube 24 while moving from a standby position to a cutting position by centrifugal force. For reference, the blade 310 is located in a mounting recess 210 of the protection member 200, a slot 212 may be provided in the mounting recess 210 to allow the blade 310 to move forward in the cutting direction. A fixing pin 312 of the blade 310 is inserted into the slot 212. When the cutting operation is completed and the operation of the driving unit 110 is stopped, the blade 310 is returned from the cutting position to the standby position by an elastic member 390.

Figure 4:
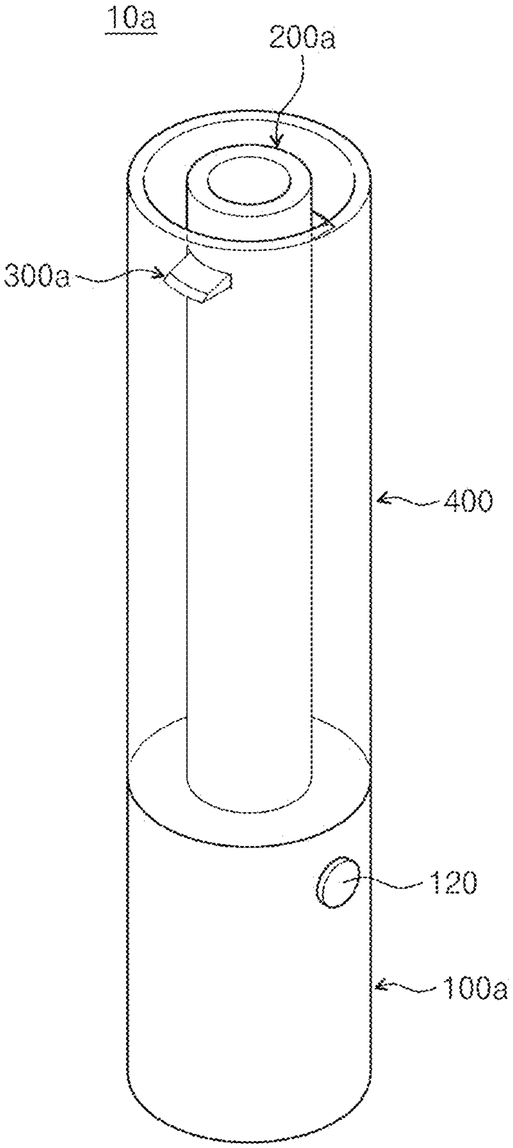
FIGS. 4 and 5 are a perspective view and a front view illustrating a cutter apparatus for a double tube according to a second exemplary embodiment of the present invention.
Figure 5:
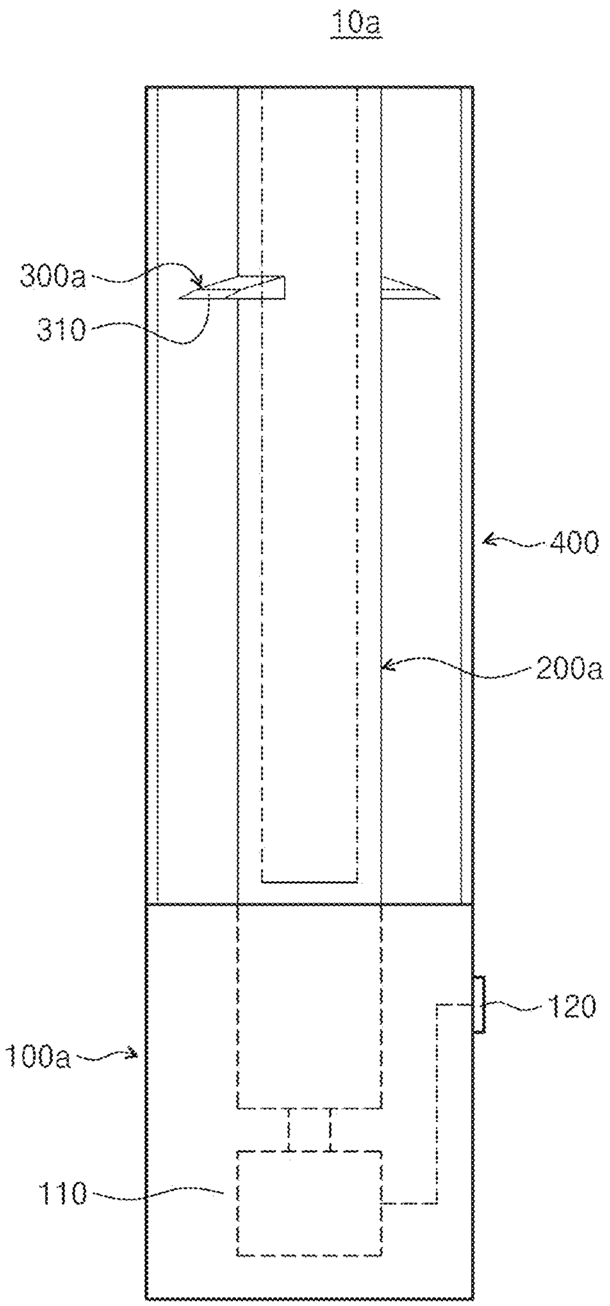

FIGS. 4 and 5 are a perspective view and a front view illustrating a cutter apparatus for a double tube according to a second exemplary embodiment of the present invention.

Referring to FIGS. 4 and 5, a cutter apparatus 10*a* for a double tube according to the present exemplary embodiment includes a main body 100*a*, a protection member 200*a*, and a cutter member 300*a*, which provide with a configuration and function substantially similar to the main body 100, the protection member 200, and the cutter member 300 illustrated in FIGS. 1 and 2, so that hereinafter, the second exemplary embodiment will be mainly described with the difference from the first exemplary embodiment.

In the present exemplary embodiment, the cutter apparatus 10*a* for the double tube may further include an outer cover 400. The outer cover 400 may be installed on the main body to surround the protection member 200*a*. A space is provided between the outer cover 400 and the protection member 200*a*, and the outer tube 24 of a double tube 20 may be positioned in the space. The outer cover 400 may be provided in a cylindrical shape. The outer cover 400 may be provided transparently so that the operator can easily check the cutting operation of the outer tube 24.

Figure 6:
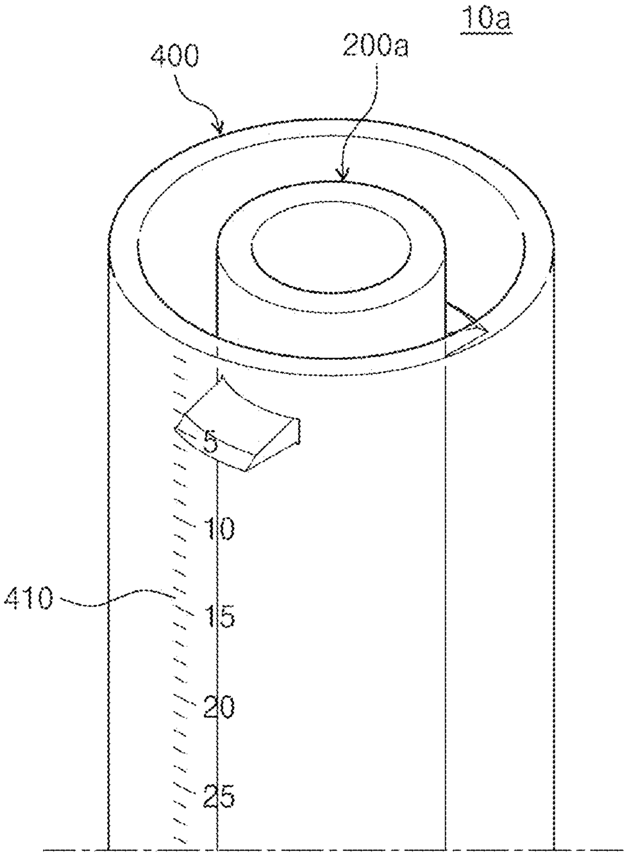
FIG. 6 is a modified example of the cutter apparatus for the double tube illustrated in FIG. 4.

FIG. 6 is a modified example of the cutter apparatus for the double tube illustrated in FIG. 4.

As illustrated in FIG. 6, the outer cover 400 of the cutter apparatus 10*a* for the double tube has a scale 410 on the outer surface. The operator may check the cut length of the outer tube 24 by looking at the scale 410.

Figure 7:
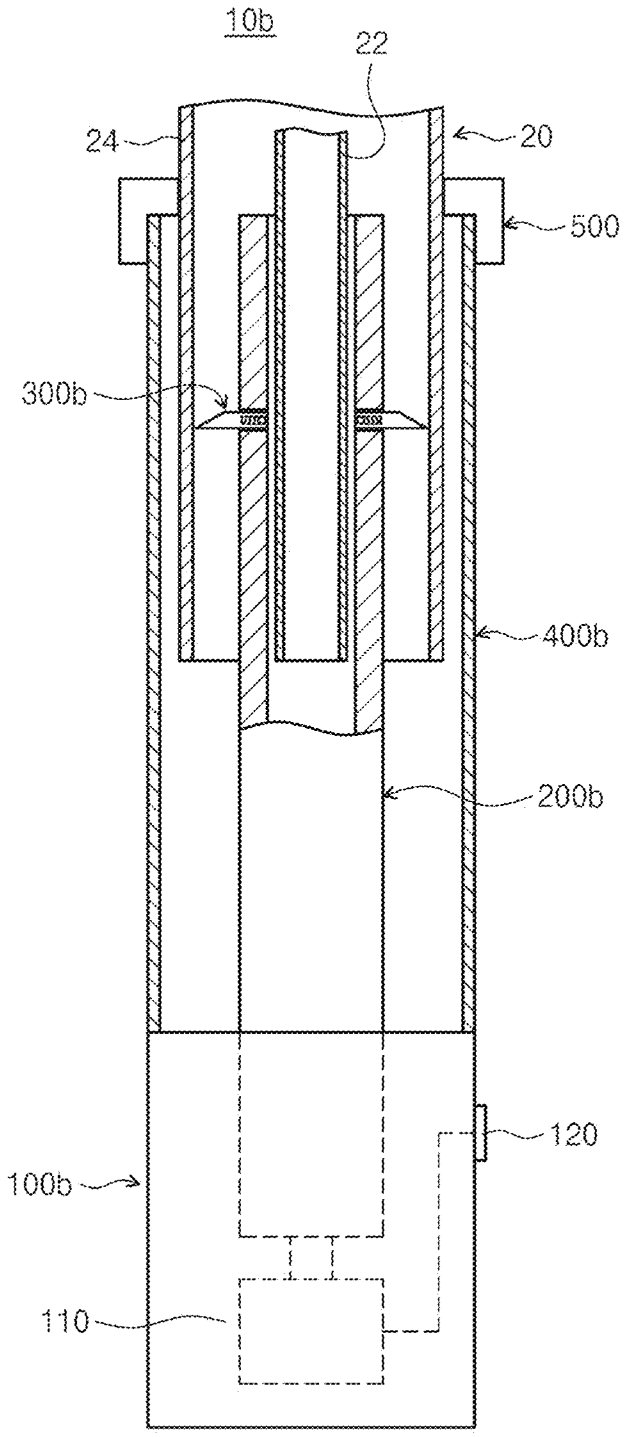
FIG. 7 is a cross-sectional view illustrating a cutter apparatus for a double tube according to a third exemplary embodiment of the present invention.

FIG. 7 is a cross-sectional view illustrating a cutter apparatus for a double tube according to a third exemplary embodiment of the present invention.

Referring to FIG. 7, a cutter apparatus 10*b* for a double tube according to the present exemplary embodiment includes a main body 100*b*, a protection member 200*b*, and a cutter member 300*b*, which provide with a configuration and function substantially similar to the main body 100*a*, the protection member 200*a*, and the cutter member 300*a* illustrated in FIGS. 4 and 5, so that hereinafter, the third exemplary embodiment will be mainly described with the difference from the second exemplary embodiment.

In the exemplary embodiment, it is characterized in that the cutter apparatus 10*b* for the double tube further includes a tube fixing member 500 for fixing a double tube 20 before cutting an outer tube 24. The cutter apparatus 10*b* for the double tube may cut the outer tube 24 by using the cutter member in a state in which the double tube 20 is fixed by the tube fixing member 500.

Figure 8:
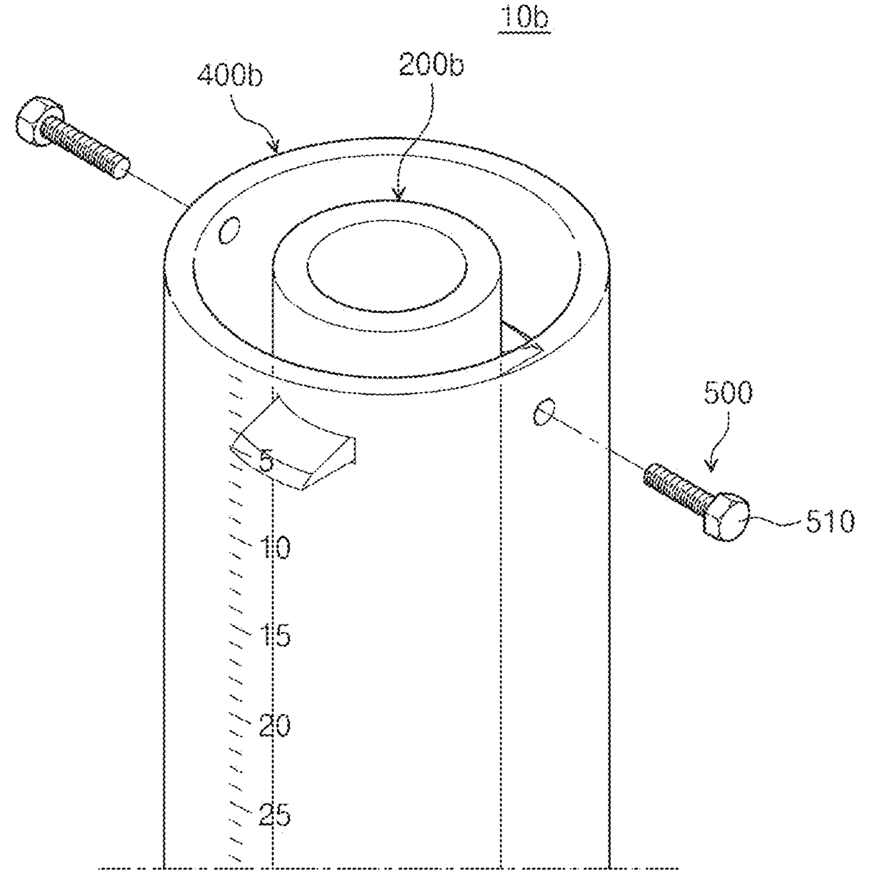
FIGS. 8 and 9 are modified examples of a tube fixing member illustrated in FIG. 7.
Figure 9:
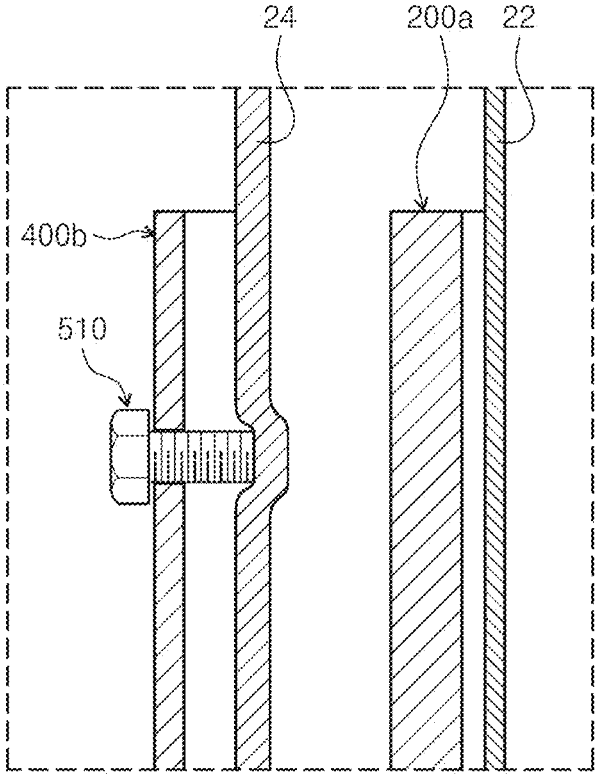

FIGS. 8 and 9 are modified examples of a tube fixing member illustrated in FIG. 7.

As illustrated in FIGS. 8 and 9, the tube fixing member 500 may be installed on the outer cover 400*b*. The tube fixing member 500 may include pressing pins 510 that pass through an outer cover 400*b* and pressurize the outer surface of the outer tube 24.

Figure 10:
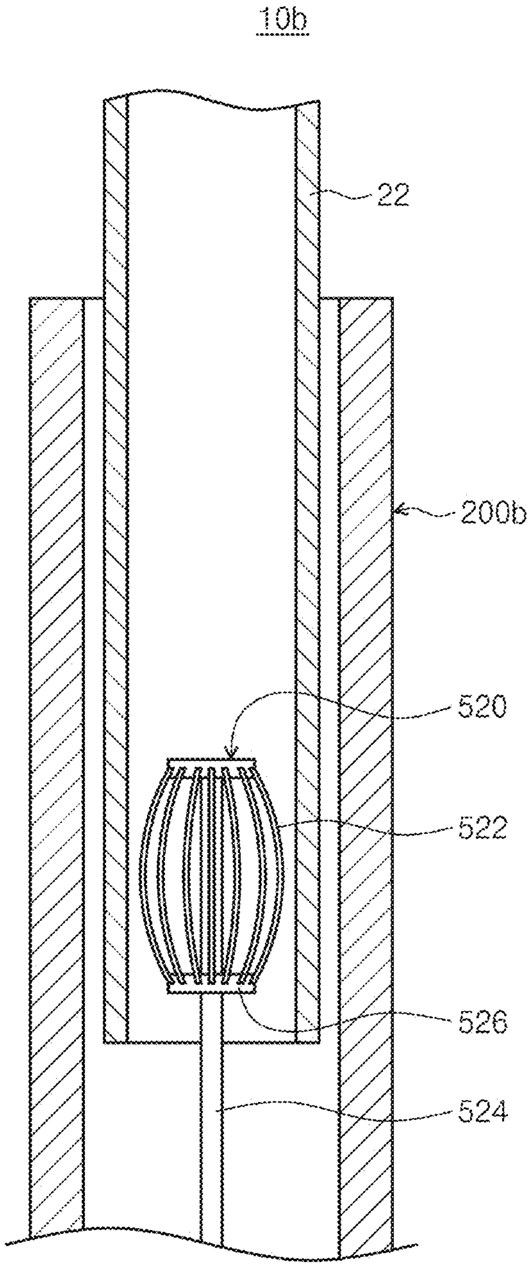
FIGS. 10 and 11 are another modified example of the tube fixing member illustrated in FIG. 7.
Figure 11:
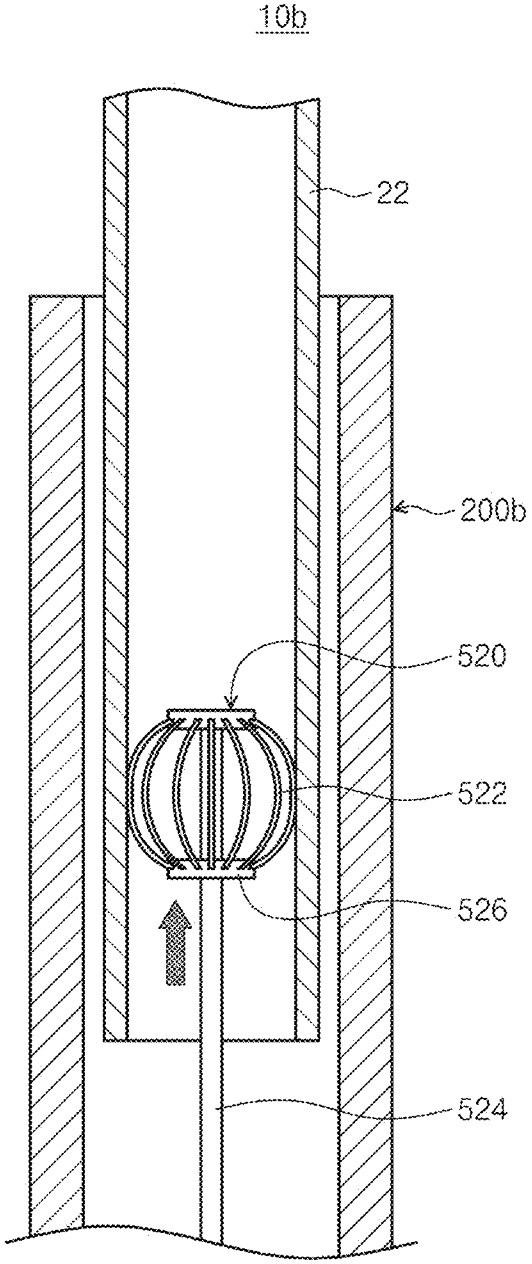

FIGS. 10 and 11 are another modified example of the tube fixing member illustrated in FIG. 7.

As illustrated in FIGS. 10 and 11, the tube fixing member may be provided in the form of an expandable member 520 installed inside an inner cover 200*b*. The expandable member 520 may be inserted into the inner tube 22 to pressurize the inner surface of the inner tube 22 by an inflation operation. The expandable member 520 may expand during the cutting operation. For example, the expandable member 520 includes a shaft 524, and a plurality of ribs 522 fixed to an end of the shaft 524 and including one end fixed to a lifting plate 526 movable on the shaft 524. The ribs 522 are stretched close to a straight line when the lifting plate 5260 moves down, and when the lifting plate 526 moves up, the ribs 522 are inflated to be curved to the outside and come into contact with the inner surface of the inner tube 22.

Figure 12:
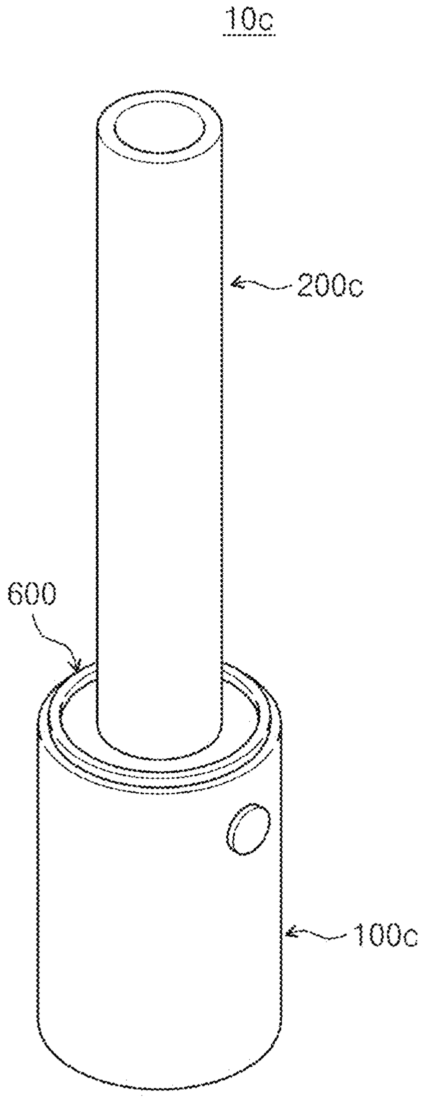
FIGS. 12 and 13 are cross-sectional views illustrating a cutter apparatus for a double tube according to a fourth exemplary embodiment of the present invention.
Figure 13:
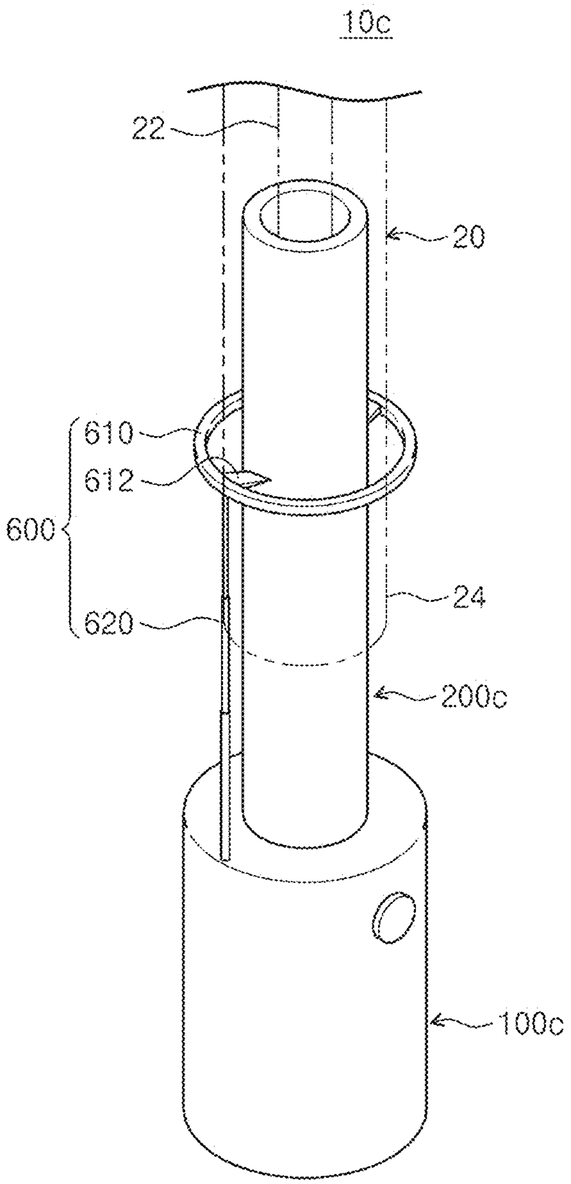

FIGS. 12 and 13 are cross-sectional views illustrating a cutter apparatus for a double tube according to a fourth exemplary embodiment of the present invention.

Referring to FIGS. 12 and 13, a cutter apparatus 10*c* for a double tube according to the present exemplary embodiment includes a main body 100*c*, a protection member 200*c*, and a cutter member 600, which provide with a configuration and function substantially similar to the main body 100 and the protection member 200 illustrated in FIGS. 1 and 2, so that hereinafter, the fourth exemplary embodiment will be mainly described with the difference from the first exemplary embodiment.

In the present exemplary embodiment, the cutter member 600 of the cutter apparatus 10*c* for the double tube may be provided to the main body. The cover member 600 may include a support 620 that can be moved up and moved down by a telescopic method in which the support 620 may be stretched and reduced while overlapping parts, and a support ring 610 installed at the end of the support 620 and supporting the blade 612.

The cutter member having the above structure may be rotated along the rotation radius of the double tube in the main body for cutting the outer tube 24. Alternatively, the cutter member may be rotated manually while the operator holds the main body by hand to perform the cutting operation.

Figure 14:
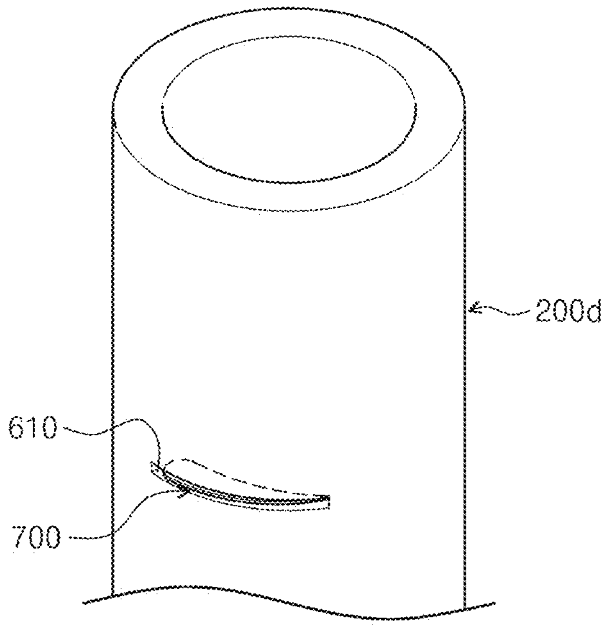
FIG. 14 to 15B are views illustrating another example of a cutter member in the cutter apparatus for the double tube.
Figure 15A:
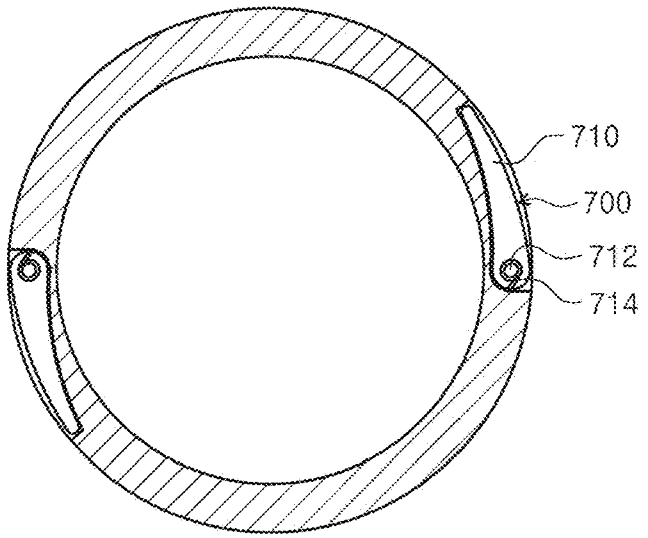
Figure 15B:
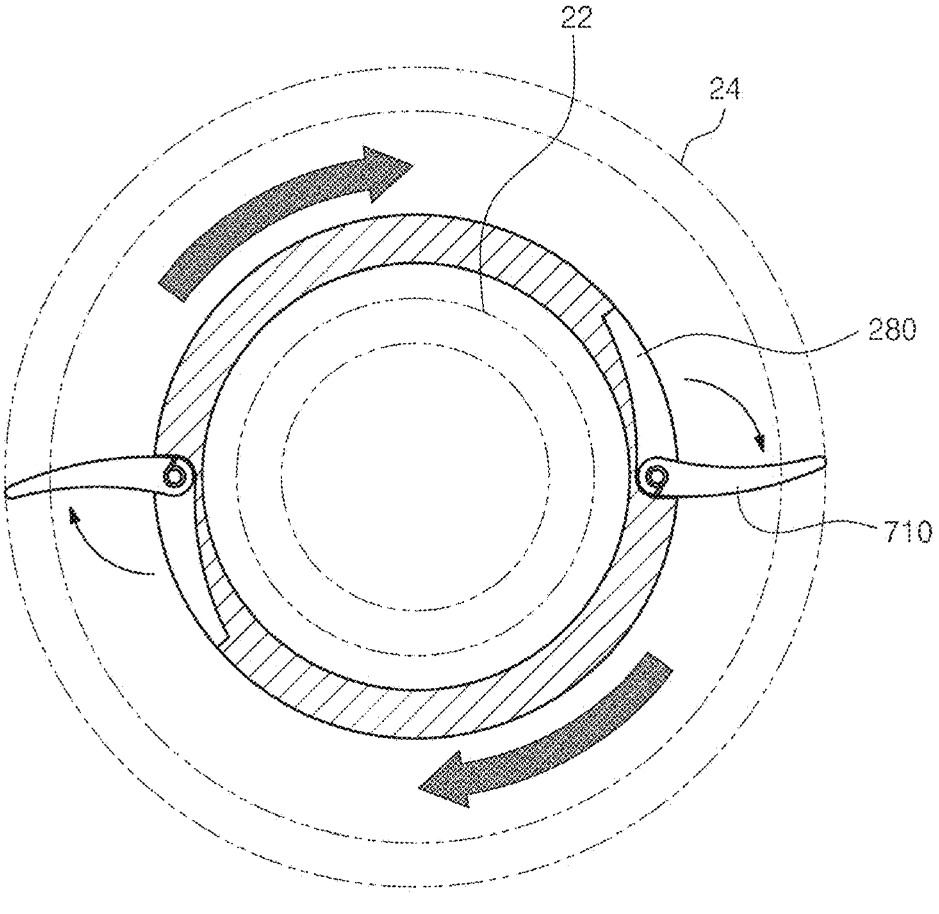

FIG. 14 to 15B are views illustrating another example of a cutter member in the cutter apparatus for the double tube.

As illustrated in FIGS. 14 to 15*b*, a cutter member 700 includes blades 710 installed in a protection member 200*d*. The blade 710 may be pin-coupled to an insertion recess 280 of the protection member 200*d* to be spread by centrifugal force when the protection member 200*d* rotates. As illustrated in FIG. 15A, the blade 710 waits in a state of being inserted into the insertion recess 280 before the cutting operation, and as illustrated in FIG. 15B, the blade 710 is spread to a cutting position at which the blade 710 is capable of cutting the outer tube 24 by centrifugal force during the cutting operation. At this time, the blade 710 is rotatably coupled to the protection member 200*d* by the pin 712, and when the cutting operation is completed and the operation of a driving unit (not illustrated) stops, the blade 710 is returned to the standby position from the cutting position by an elastic member 714.

The foregoing detailed description illustrates the present invention. Further, the above content illustrates and describes the exemplary embodiment of the present invention, and the present invention can be used in various other combinations, modifications, and environments. That is, the foregoing content may be modified or corrected within the scope of the concept of the invention disclosed in the present specification, the scope equivalent to that of the disclosure, and/or the scope of the skill or knowledge in the art. The foregoing exemplary embodiment describes the best state for implementing the technical spirit of the present invention, and various changes required in specific application fields and uses of the present invention are possible. Accordingly, the detailed description of the invention above is not intended to limit the invention to the disclosed exemplary embodiment. Further, the accompanying claims should be construed to include other exemplary embodiments as well.

What is claimed is:

1. A cutter apparatus for a double tube, comprising:

a main body;

a cylindrical protection member connected to the main body, the cylindrical protection member defining a space therewithin and the cylindrical protection member being configured to receive in the space an inner tube of the double tube, the double tube including the inner tube and an outer tube; and a cutter member coupled to and protruding from the cylindrical protection member, the cutter member including a blade configured to cut the outer tube, wherein the cylindrical protection member is configured to receive the inner tube such that the outer tube surrounds a portion of the cylindrical protection member and the cutter member.

2. The cutter apparatus for the double tube of claim 1, wherein the blade is configured to fold on the cylindrical protection member, and is configured to protrude from the cylindrical protection member when the outer tube is cut.

3. The cutter apparatus for the double tube of claim 1, wherein the cylindrical protection member is rotatably connected to the main body, and the main body includes a drive configured to rotate the cylindrical protection member.

4. The cutter apparatus for the double tube of claim 1, further comprising:

a cylindrical outer cover on the main body and surrounding the cylindrical protection member.

5. The cutter apparatus for the double tube of claim 4, wherein the cylindrical outer cover includes a transparent material, and includes a scale to check a length of the outer tube to be cut.

6. The cutter apparatus for the double tube of claim 4, further comprising:

a tube fixing member configured to fix the double tube before cutting the outer tube.

7. The cutter apparatus for the double tube of claim 6, wherein the tube fixing member includes a plurality of pressing pins on the cylindrical outer cover, the plurality of pressing pins being configured to press the outer tube.

8. The cutter apparatus for the double tube of claim 6, wherein the tube fixing member includes an expandable member configured to be inserted into the inner tube and configured to fix the inner tube by an expansion operation.

9. A cutter apparatus for a double tube, the cutter apparatus for the double tube comprising:

a main body;

a cylindrical protection member rotatably connected to the main body and defining a space therewithin, the cylindrical protection member being configured to receive in the space an inner tube of the double tube, the double tube including the inner tube and an outer tube;

a cutter member on the cylindrical protection member and including a blade configured to cut the outer tube, wherein the cylindrical protection member is configured to receive the inner tube such that the outer tube surrounds a portion of the cylindrical protection member and the cutter member; and a drive configured to rotate the cylindrical protection member.

10. The cutter apparatus for the double tube of claim 9, wherein the blade is configured to fold on the cylindrical protection member, and is configured to protrude when the outer tube is cut.

11. The cutter apparatus for the double tube of claim 9, further comprising:

a cylindrical outer cover on the main body and surrounding the cylindrical protection member.

12. The cutter apparatus of claim 11, wherein the cylindrical outer cover includes a transparent material, and includes a scale to check a length of the outer tube to be cut.

13. The cutter apparatus for the double tube of claim 11, further comprising:

a tube fixing member configured to fix the double tube before cutting the outer tube.

14. The cutter apparatus for the double tube of claim 13, wherein the tube fixing member includes pressing pins on the cylindrical outer cover and configured to press the outer tube.

15. The cutter apparatus for the double tube of claim 13, wherein the tube fixing member includes an expandable member configured to be inserted into the inner tube and configured to fix the inner tube by an expansion operation.

16. A cutter apparatus for a double tube, comprising:

a main body;

a cylindrical protection member connected to the main body and defining a space therewithin, the cylindrical protection member being configured to receive in the space an inner tube of the double tube, the double tube including the inner tube and an outer tube;

a cutter member disposed on the cylindrical protection member and including a blade configured to cut the outer tube, wherein the cylindrical protection member is configured to receive the inner tube such that the outer tube surrounds a portion of the cylindrical protection member and the cutter member; and a cylindrical outer cover on the main body and surrounding the outer tube, the outer tube being outside the cylindrical protection member.

17. The cutter apparatus for the double tube of claim 16, wherein the cylindrical outer cover includes a transparent material, and a scale to check a cut length of the outer tube.

18. The cutter apparatus for the double tube of claim 17, further comprising:

a tube fixing member configured to fix the double tube before the outer tube is cut.

* * * * *